United States Patent
Toraya et al.

(10) Patent No.: US 11,402,341 B2
(45) Date of Patent: Aug. 2, 2022

(54) QUANTITATIVE PHASE ANALYSIS DEVICE FOR ANALYZING NON-CRYSTALLINE PHASES, QUANTITATIVE PHASE ANALYSIS METHOD FOR ANALYZING NON-CRYSTALLINE PHASES, AND NON-TRANSITORY COMPUTER-READABLE STORAGE MEDIUM STORING QUANTITATIVE PHASE ANALYSIS PROGRAM FOR ANALYZING NON-CRYSTALLINE PHASES

(71) Applicant: RIGAKU CORPORATION, Akishima (JP)

(72) Inventors: Hideo Toraya, Akishima (JP); Norihiro Muroyama, Akishima (JP)

(73) Assignee: RIGAKU CORPORATION, Akishima (JP)

( * ) Notice: Subject to any disclaimer, the term of this patent is extended or adjusted under 35 U.S.C. 154(b) by 0 days.

(21) Appl. No.: 17/061,949

(22) Filed: Oct. 2, 2020

(65) Prior Publication Data
US 2021/0018452 A1 Jan. 21, 2021

Related U.S. Application Data

(63) Continuation of application No. PCT/JP2019/002309, filed on Jan. 24, 2019.

(30) Foreign Application Priority Data

Apr. 2, 2018 (JP) .............................. JP2018-071024

(51) Int. Cl.
*G01N 23/2055* (2018.01)
*G01N 23/207* (2018.01)

(52) U.S. Cl.
CPC ....... *G01N 23/2055* (2013.01); *G01N 23/207* (2013.01); *G01N 2223/0566* (2013.01)

(58) Field of Classification Search
CPC ....... G01N 2223/0566; G01N 2223/62; G01N 2223/633; G01N 23/2055; G01N 23/207
See application file for complete search history.

(56) References Cited

U.S. PATENT DOCUMENTS 5,812,630 A * 9/1998 Blaffert .................. G06F 17/16
378/57
6,327,334 B1 * 12/2001 Murray, Jr. .......... G06K 9/6232
378/71

(Continued)

FOREIGN PATENT DOCUMENTS

WO 2017149913 A1 9/2017

OTHER PUBLICATIONS

Hideo Toraya, "A new method for quantitative phase analysis using X-ray powder diffraction: direct derivation of weight fractions from observed integrated intensities and chemical composition", 2016 Journal of Applied crystallography, 49, 1508-1516 (Year: 2017).*

(Continued)

*Primary Examiner* — Dani Fox
*Assistant Examiner* — Soorena Kefayati
(74) *Attorney, Agent, or Firm* — Cantor Colburn LLP

(57) ABSTRACT

A quantitative phase analysis device for analyzing non-crystalline phases comprising at least one microprocessor configured to: acquire the powder diffraction pattern of the sample; acquire information on one non-crystalline phase and one or more crystalline phases contained in the sample; acquire a fitting function; execute whole-powder pattern fitting, acquire a fitting result; and calculate a weight ratio of the one non-crystalline phase and the one or more crystalline phases. The fitting function for each of the one or more (Continued)

crystalline phases is one fitting function selected from the group consisting of a first fitting function that uses an integrated intensity obtained by whole-powder pattern decomposition, a second fitting function that uses an integrated intensity obtained by observation or calculation, and a third fitting function that uses a profile intensity obtained by observation or calculation. The fitting function for the one non-crystalline phase is the third fitting function.

5 Claims, 11 Drawing Sheets

(56) References Cited

U.S. PATENT DOCUMENTS

| | | | | |
|---|---|---|---|---|
| 8,111,807 | B2* | 2/2012 | Ida | G01N 23/207 378/70 |
| 11,073,625 | B2* | 7/2021 | Nelson | G01T 1/2018 |
| 2002/0003857 | A1* | 1/2002 | Koyanagi | G01N 23/20 378/207 |
| 2003/0198997 | A1* | 10/2003 | Von Dreele | G01N 23/207 435/7.1 |
| 2004/0039533 | A1* | 2/2004 | Neumann | G01N 23/207 702/28 |
| 2004/0103130 | A1* | 5/2004 | Ivanisevic | G01N 23/2055 708/200 |
| 2005/0099423 | A1* | 5/2005 | Brauss | G06T 11/206 345/440 |
| 2006/0015265 | A1* | 1/2006 | Raich | G01N 23/20 702/22 |
| 2007/0270397 | A1* | 11/2007 | Bates | G01N 23/207 514/210.01 |
| 2008/0084964 | A1* | 4/2008 | Dosho | G01N 23/20 378/81 |
| 2010/0246768 | A1* | 9/2010 | Toraya | B82Y 10/00 378/83 |
| 2013/0197817 | A1* | 8/2013 | Billinge | G16C 99/00 702/28 |
| 2014/0114602 | A1* | 4/2014 | Billinge | G01N 23/207 702/104 |
| 2014/0278147 | A1* | 9/2014 | Sasaki | G01N 23/207 702/28 |
| 2015/0276629 | A1* | 10/2015 | Ruf | G01N 23/20016 378/73 |
| 2015/0300965 | A1* | 10/2015 | Sezginer | G01N 23/207 378/86 |
| 2016/0258889 | A1* | 9/2016 | Van Den Hoogenhof | G01N 23/207 |
| 2016/0320319 | A1* | 11/2016 | Hench | G01N 23/207 |
| 2017/0131224 | A1* | 5/2017 | Paulus | G01N 23/087 |
| 2017/0199136 | A1* | 7/2017 | Krokhmal | G01N 23/207 |
| 2017/0371047 | A1* | 12/2017 | Marui | G01N 23/207 |
| 2018/0364183 | A1 | 12/2018 | Toraya et al. | |
| 2021/0285898 | A1* | 9/2021 | Dikopoltsev | G01B 15/02 |

OTHER PUBLICATIONS

Alexander et al., "Basic Aspects of X-Ray Absorption", Analytical Chemistry, vol. 20, No. 10, Oct. 1948; pp. 886-889.

Chung, "Quantitative Interpretation of X-Ray Diffraction Patterns of Mixtures. I. Matrix-Flushing Method for Quantitative Multicomponent Analysis.", Journal of Applied Crystallography, Jul. 5, 1973, vol. 7, pp. 519-525.

Chung, "Quantitative Interpretation of X-Ray Diffraction Patterns of Mixtures. I1. Adiabatic Principle of X-ray Diffraction Analysis of Mixtures.", Journal of Applied Crystallography, Jul. 5, 1973, vol. 7, pp. 526-531.

De La Torre et al. "Rietveld quantitative amorphous content analysis", Journal of Applied Crystallography, (Feb. 5, 2001) vol. 34, No. 50, pp. 196-202.

Hill et al. "Quantitative Phase Analysis from Neutron Powder Diffraction Data Using the Rietveid Method", Journal of Applied Crystallography, Jun. 23, 1987, vol. 20, pp. 467-474.

Scarlett et al. "Quantification of phases with partial or no known crystal structures", Powder Diffraction, vol. 21, No. Dec. 4, 2006, pp. 278-284.

Smith et al., "Qualitative X-Ray Powder Diffraction Method Using the Full Diffraction Pattern", Powder Diffraction, vol. 2, No. 2, Jun. 1987; 5 pages.

Toraya et al., "Quantitative Phase Analysis using the Whole-Powder-Pattern Decomposition Method.I. Solution from Knowledge of Chemical Compositions", Journal of Applied Crystallography, Dec. 21, 1994, vol. 28, pp. 392-399.

Toraya, "A new method for quantitative phase analysis using X-ray powder diffraction: direct derivation of weight fractions from observed integrated intensities and chemical compositions of individual phases" Journal of Applied Crystallography, Jun. 28, 2016, Vo. 49, pp. 1508-1516.

Toraya, "Quantitative phase analysis using observed integrated intensities and chemical composition data of individual crystalline phases: quantification of materials with indefinite chemical compositions", Journal of Applied Crystallograpy, Apr. 2, 2017, vol. 50, pp. 820-829.

Werner, "Quantitative Analysis of Multicomponent Powders by Full-Profile Refinement of Guinier-Hiigg X-Ray Film Data", Journal of Applied Crystallography, Sep. 26, 1978, vol. 12, pp. 107-109.

EPO Extended European Search Report for corresponding EP Application No. 19782313.1; dated Nov. 15, 2021.

Pourghahramani et al:"The characterization of structural changes in hematite ground in a confined particle bed using Rietveld analysis", International Journal of Mineral Processing, Elsevier Science Publishers, Amsterdam, NL, vol. 83, No. 1-2, Jun. 6, 2007, pp. 47-59.

* cited by examiner

FIG.3

| SET | CRYSTALLINE | NON-CRYSTALLINE |
|---|---|---|
| 1 | $SiO_2$ | $SiO_2$ |
| 2 | $SiO_2$ | $GeO_2$ |
| 3 | $GeO_2$ | $SiO_2$ |
| 4 | $GeO_2$ | $GeO_2$ |

FIG.9

| MAIN PURPOSE | SAMPLE | $w_1$ | $w_2$ | $w_3$ | $w_4$ |
|---|---|---|---|---|---|
| THREE-COMPONENT SAMPLE | $GeO_2$ + ZnO + (AMORPHOUS)$SiO_2$ (1:1:1) | 33.479 | 33.416 | 33.105 | |
| FOUR-COMPONENT SAMPLE | $GeO_2$ + ZnO + $\alpha$-$Al_2O_3$ + (AMORPHOUS)$SiO_2$ (1:1:1:1) | 25.076 | 24.925 | 25.121 | 24.878 |

FIG.11A

| 2θrange | $\Delta w_1$ | $\Delta w_2$ | $\Delta w_3$ | RMSE | $R_{wp}$ | $\chi^2$ |
|---|---|---|---|---|---|---|
| 3 - 125º | -1.584 | 3.225 | -1.641 | 2.281 | 5.32 | 1.99 |
| 3 - 100º | -0.599 | 1.909 | -1.310 | 1.380 | 5.27 | 2.10 |

FIG.11B

| 2θrange | $\Delta w_1$ | $\Delta w_2$ | $\Delta w_3$ | $\Delta w_4$ | RMSE | $R_{wp}$ | $\chi^2$ |
|---|---|---|---|---|---|---|---|
| 3 - 125 º | -1.261 | 1.811 | 1.158 | -1.708 | 1.744 | 5.02 | 1.82 |
| 3 - 100º | -0.037 | 1.616 | -0.469 | -1.109 | 1.164 | 4.91 | 1.90 |

QUANTITATIVE PHASE ANALYSIS DEVICE FOR ANALYZING NON-CRYSTALLINE PHASES, QUANTITATIVE PHASE ANALYSIS METHOD FOR ANALYZING NON-CRYSTALLINE PHASES, AND NON-TRANSITORY COMPUTER-READABLE STORAGE MEDIUM STORING QUANTITATIVE PHASE ANALYSIS PROGRAM FOR ANALYZING NON-CRYSTALLINE PHASES

CROSS-REFERENCE TO RELATED APPLICATION

This application is a continuation application of International Application PCT/JP2019/002309 filed on Jan. 24, 2019, which claims priority from Japanese patent application JP2018-071024 filed on Apr. 2, 2018. The contents of these applications are incorporated herein by reference in their entirety.

TECHNICAL FIELD

The present invention relates to quantitative phase analysis device for analyzing non-crystalline phases, a quantitative phase analysis method for analyzing non-crystalline phases, and A non-transitory computer-readable storage medium storing a quantitative phase analysis program for analyzing non-crystalline phases, which are configured to perform quantitative phase analysis of each component of a sample based on a powder diffraction pattern of the sample. In particular, the present invention relates to quantitative analysis of a sample containing a non-crystalline component.

BACKGROUND ART

When a sample is a mixture sample containing one non-crystalline phase and one or more crystalline phases, a powder diffraction pattern of the sample is acquired, for example, by measurement using an X-ray diffractometer. The powder diffraction pattern of a crystalline phase is specific to the crystalline phase, and the powder diffraction pattern of the sample is a powder diffraction pattern acquired by adding up powder diffraction patterns of the one non-crystalline phase and the one or more crystalline phases contained in the sample based on contents. In the present application, the "crystalline phase" refers to a crystalline pure substance solid and has a chemical composition and a crystalline structure. The "non-crystalline phase" refers to a substance that is a pure substance solid and does not have a long-range order as in the crystalline phase, but has a short-range order.

Qualitative phase analysis involves analyzing which substance exists in the sample. Quantitative phase analysis involves analyzing in which quantitative ratio the substance contained in the sample exists. In this case, as the premise for performing quantitative phase analysis, it is assumed that qualitative phase analysis of the substance contained in the sample has been performed.

It is difficult to analyze a powder diffraction pattern (non-crystalline halo) of the non-crystalline phase. Accordingly, for example, as disclosed in Literature 1 listed below, there has hitherto been performed a method in which, when a sample contains an non-crystalline phase (non-crystalline component), a standard reference material (SRM) is added to the sample, and quantitative phase analysis of the non-crystalline phase is performed with reference to a powder diffraction pattern of the standard reference material, for example.

CITATION LIST

List of Literature

[L 1] G. De La Torre, S. Bruque and M. A. G. Aranda, "Rietveld quantitative amorphous content analysis", J. Appl. Cryst., 2001, No. 50, pages 196 to 202

[L 2] Hideo Toraya, "A new method for quantitative phase analysis using X-ray powder diffraction: direct derivation of weight fractions from observed integrated intensities and chemical compositions of individual phases", J. Appl. Cryst., 2016, No. 49, pages 1508 to 1516

[L 3] Hideo Toraya, "Quantitative phase analysis using observed integrated intensities and chemical composition data of individual crystalline phases: quantification of materials with indefinite chemical compositions", J. Appl. Cryst., 2017, No. 50, pages 820 to 829

[L 4] Alexander, L. E. & Klug, H. P., Anal. Chem., 1948, No. 20, pages 886 to 889

[L 5] Chung, F. H., "Quantitative Interpretation of X-ray Diffraction Patterns of Mixtures. I. Matrix-Flushing Method for Quantitative Multicomponent Analysis", J. Appl. Cryst., 1974, No. 7, pages 519 to 525

[L 6] Chung, F. H., "Quantitative Interpretation of X-ray Diffraction Patterns of Mixtures. II. Adiabatic Principle of X-ray Diffraction Analysis of Mixtures", J. Appl. Cryst., 1974, No. 7, pages 526 to 531

[L 7] Werner, P.-E., Salome, S., Malmros, G., and Thomas, J. O., "Quantitative Analysis of Multicomponent Powders by Full-Profile Refinement of Guinier-Hagg X-ray Film Data", J. Appl. Cryst., 1979, No. 12, pages 107 to 109

[L 8] Hill, R. J. and Howard, C. J., "Quantitative Phase Analysis from Neutron Powder Diffraction Data Using the Rietveld Method", J. Appl. Cryst., 1987, No. 20, pages 467 to 474

[L 9] Toraya, H. and Tsusaka S., "Quantitative Phase Analysis using the Whole-Powder-Pattern Decomposition Method. I. Solution from Knowledge of Chemical Compositions", J. Appl. Cryst., 1995, No. 28, pages 392 to 399

[L 10] Smith, D. K., Johnson, G. G. Jr., Scheible, A., Wims, A. M., Johnson, J. L. and Ullmann, G., "Quantitative X-Ray Powder Diffraction Method Using the Full Diffraction Pattern", Power Diffr., 1987, No. 2, pages 73 to 77

[L 11] Scarlett, N. V. Y. and Madsen, I. C., "Quantification of phases with partial or no known crystal structure", Powder Diffraction, 2006, No. 21, pages 278 to 284

SUMMARY OF INVENTION

Technical Problem

However, when a standard reference material is added to a sample, time and effort required for a step of performing quantitative phase analysis are significantly increased, and further, a state of the sample itself changes from an original state through addition of the standard reference material. As a result of extensive investigation, the inventors of the present invention have found that the quantitative phase analysis is enabled even when a non-crystalline phase is contained in a sample by adopting a direct-derivation method (DD method). In the following, the DD method is described.

In Literature 2 and Literature 3, there is a description regarding an intensity-composition (IC) formula to be used in the present invention. The IC formula is described below. It is assumed that K (K represents an integer of 2 or more) crystalline phases are contained in a powder sample, and a j-th (j represents an integer of 1 or more) diffraction line of a k-th (k represents an integer of 1 or more and K or less) crystalline phase has an integrated intensity Ijk. The integrated intensity Ijk of each diffraction line (j-th diffraction line of k-th crystalline phase) in a powder diffraction pattern of the sample is given by the following Expression 1 in the case of X-ray powder diffraction having an optical system based on the Bragg-Brentano geometry.

$$I_{jk} = I_0 \frac{Q}{\mu} \frac{V_k}{U_k^2} G_{jk}^{-1} m_{jk} |F_{jk}|^2 \tag{1}$$

In Expression 1, "$I_0$" represents an incident X-ray intensity, "$V_k$" represents an irradiated volume of a k-th crystalline phase, "$Q$" represents a constant including an incident X-ray intensity, a physical constant, for example, the speed of light, and an optical system parameter, "$\mu$" represents a linear absorption coefficient of the powder sample, "$U_k$" represents a unit cell volume of the k-th crystalline phase, "$m_{jk}$" represents a multiplicity of reflection, and "$F_{jk}$" represents a crystal structure factor. $G_{jk}$ is defined by the following Expression 2 by using a Lorentz-polarization factor (hereinafter referred to as "Lp factor") $Lp_{jk}$ and a factor ($\sin \theta_{jk}$) relating to a slit width of received light.

$$G_{jk} = \frac{\sin \theta_{jk}}{Lp_{jk}} = \frac{2 \sin \theta_{jk} \sin 2\theta_{jk}}{1 + \cos^2 2\theta_{jk}} \tag{2}$$

Expression 2 is based on the assumption that an optical system, in which a one-dimensional detector is placed on the diffraction side, is employed, and it is to be understood that the expression is calculated in a different manner in an optical system in which a monochromator is placed on the diffraction side.

A weight factor ($W_k$) of the k-th crystalline phase corresponding to the irradiated volume $V_k$ is calculated to be $W_k = V_k d_k$ by multiplying the irradiated volume $V_k$ by a material density $d_k (= Z_k M_k / U_k)$ of the k-th crystalline phase. The irradiated volume $V_k$ is $V_k = W_k U_k / (Z_k M_k)$, and Expression 1 is transformed into the following Expression 3. The number of chemical formula unit (i.e. the number of the atoms (or molecules) in the k-th crystalline phase) is represented by "$Z_k$", and a chemical formula weight is represented by "$M_k$".

$$I_{jk} = I_0 \frac{Q}{\mu} \frac{W_k}{Z_k M_k U_k} G_{jk}^{-1} m_{jk} |F_{jk}|^2 \tag{3}$$

The following Expression 4 is obtained by multiplying both sides of Expression 3 by $G_{jk}$, and taking the sum for the k-th crystalline phase.

$$\sum_{j=1}^{N_k} I_{jk} G_{jk} = I_0 \frac{Q}{\mu} \frac{W_k}{M_k} \frac{1}{Z_k} \left[ \frac{1}{U_k} \sum_{j=1}^{N_k} m_{jk} |F_{jk}|^2 \right] \tag{4}$$

In this expression, "$N_k$" represents the number of diffraction lines of the k-th crystalline phase (j is thus an integer of 1 or more and $N_k$ or less). Ideally, $N_k$ is the total number of diffraction lines of the k-th crystalline phase. However, in actuality, the range of $2\theta$ of the powder diffraction pattern to be observed is finite. Thus, the sum means a finite sum, and $N_k$ may be the number of diffraction lines in the range of $2\theta$, which is selected by a user. It suffices that the range of $2\theta$ includes a sufficient number of diffraction lines required for performing quantitative phase analysis. Further, there may be an actually existing diffraction line that is not included in the sum, as required.

Terms inside the square brackets of the right side of Expression 4 correspond to a peak height of the Patterson function at the origin. When the peak height is approximated by an integrated value of that peak, the amount is proportional to an amount obtained by taking a sum of squares of the number ($n_{jk}$) of electrons belonging to an individual atom inside a chemical formula unit. Thus, when a constant of proportionality is represented by "$C$", the following Expression 5 is satisfied.

$$\frac{1}{Z_k} \left[ \frac{1}{U_k} \sum_{j=1}^{N_k} m_{jk} |F_{jk}|^2 \right] \cong C \sum_{i=1}^{N_k^A} n_{ik}^2 \tag{5}$$

In this expression, "$N_k^A$" represents the total number of atoms inside the chemical formula unit of the k-th crystalline phase. Further, the substance parameter $a_k$ is defined by the following Expression 6.

$$a_k = M_k (\Sigma_{i=1}^{N_k^A} n_{ik}^2)^{-1} \tag{6}$$

Here, the substance parameter $a_k$ represents a physical quantity specific to the crystalline phase (substance). Thus, the substance parameter may be referred to as "crystalline phase factor". Further, the parameter $S_k$ is defined by the following Expression 7.

$$S_k = \Sigma_{j=1}^{N_k} I_{jk} G_{jk} \tag{7}$$

A weight ratio of K crystalline phases contained in the sample can be calculated based on the weight factor $W_k$. In this case, the weight ratio of the K crystalline phases may be calculated as "$W_1 : W_2 : \ldots : W_K$". Alternatively, it is possible to select some of the K crystalline phases and determine a weight ratio thereof. Further, when the sample does not contain a non-crystalline component, and all the crystalline phases contained in the sample are subjected to quantitative phase analysis, the entire sample can be relatively represented by a sum "$\Sigma W_k$", where k takes values of from 1 to K. Thus, a weight fraction $w_k$ of the k-th crystalline phase can be represented by the following Expression 8.

$$w_k = W_k / \Sigma_{k'=1}^{K} W_{k'} \tag{8}$$

When Expression 4 is transformed with respect to the weight factor $W_k$, and Expression 5, Expression 6, and Expression 7 are substituted into Expression 4, the weight fraction $w_k$ is calculated by Expression 9 based on Expression 8. The Expression 9 is the IC formula.

$$w_k = a_k S_k / \Sigma_{k'=1}^{K} a_{k'} S_{k'} \tag{9}$$

The substance parameter $a_k$ given in the IC formula (Expression 9) is a physical quantity specific to the crystalline phase (substance). Thus, the substance parameter may be referred to as "crystalline phase factor". The substance parameter $a_k$ is calculated when the chemical composition of a crystalline phase is determined by qualitative phase analysis. Further, even when the sample contains a crystalline phase (uncertain crystalline phase) whose chemical composition is uncertain, the substance parameter $a_k$ of such a substance may be estimated. Further, even when the sample contains a non-crystalline phase, the substance parameter $a_k$ of the non-crystalline phase can also be calculated when the chemical composition of the non-crystalline phase is determined.

The parameter $S_k$ given in the IC formula (Expression 9) is a physical quantity calculated through measurement (observation). As indicated in Expression 7, when the integrated intensity $I_{jk}$ of each diffraction line is calculated through measurement, the parameter $S_k$ is calculated. When the K crystalline phases contained in the sample are determined through qualitative phase analysis, and the peak position (2θ) of a powder diffraction pattern of each crystalline phase is known, it is possible to determine to which one of the K crystalline phases a plurality of diffraction lines appearing in the powder diffraction pattern belong. Further, when there are superimposed diffraction lines, which are two or more diffraction lines superimposed onto one another, it is possible to calculate the parameter $S_k$ of each crystalline phase with a simple method by equally distributing the integral intensities of superimposed diffraction lines or by distributing the integral intensities of superimposed diffraction lines depending on the volume fraction, for example.

However, in order to perform quantitative phase analysis more accurately, the parameter $S_k$ is desired to be acquired accurately by fitting a calculated powder diffraction pattern to an observed powder diffraction pattern of the sample. There has been known a whole-powder pattern fitting (WPPF) method as a quantitative phase analysis technology using an X-ray powder diffraction method. In the WPPF method, various kinds of parameters are optimized by fitting the calculation pattern for the entire powder diffraction pattern of the observed sample by using a least squares method in general. Now, description will be given of representative examples of the WPPF method.

As described in Literature 4, there has been known an internal (external) standard method as an accurate method. Further, there has been known a simple quantification method of calculating the weight ratio of crystalline phases based on a ratio of a maximum peak intensity and a reference intensity ratio (RIR) value compiled into a database. The RIR quantification method using the RIR value is disclosed in Literature 5 and Literature 6. There has been known a Rietveld method using all the profile intensities within the range of measurement angles. A quantification method using the Rietveld method is disclosed in Literature 7 and Literature 8. Further, there has been known a whole-power pattern decomposition (WPPD) method of performing quantification based on a scale factor to be multiplied by an observed integrated intensity of each crystalline phase. A quantification method using the WPPD method is disclosed in Literature 9. Further, a full-pattern fitting method of performing quantitative phase analysis by fitting the powder diffraction pattern (powder diffraction pattern from which background intensity is removed) of the sample, as the profile intensity without any pre-processing of the profile intensity of the powder diffraction pattern based on prior data, is disclosed in Literature 10.

In the internal (external) standard method, it is required to obtain a sample of each single crystalline phase of a plurality of crystalline phases contained in a sample and to create a calibration curve. Therefore, the internal (external) standard method has a problem of lacking general versatility and rapidity. In the RIR quantification method using an RIR value, an RIR value compiled into a database is required. In the Rietveld method, crystal structural parameters of a plurality of crystalline phases contained in a powder sample are required. In the whole-powder pattern decomposition method, it is required to obtain a sample of a single crystalline phase. As the Rietveld method that is applicable to the case in which structural parameters are not obtained for a part of the crystalline phases of the plurality of crystalline phases, a method using an RIR value for a crystalline phase in which a structural parameter is not obtained, a PONKCS method, or the like has been known. The PONKCS method is disclosed in Literature 11. However, when a structural parameter is not obtained by any of the methods, an actually measured RIR value is required as reference data in the RIR quantification method, and a sample of a single crystalline phase or a sample close thereto is required as reference data in the PONKCS method.

In the related art, crystallographic data such as a calibration curve (internal standard method), the RIR value, or the crystal structure parameter (Rietveld method), which is acquired in an experiment, is required. However, there is a demand for a quantitative phase analysis method enabling quantitative phase analysis by performing whole-powder pattern fitting for the powder diffraction pattern of the sample with a simpler method.

The present invention has been made in view of the above-mentioned problem, and has an object to provide a quantitative phase analysis device for analyzing non-crystalline phases, a non-crystalline phase quantitative phase analysis method, and a non-transitory computer-readable storage medium storing a quantitative phase analysis program, which enable quantitative phase analysis of a sample containing one non-crystalline phase and one or more crystalline phases to be performed in a simpler manner.

(1) In order to solve the above-mentioned problem, a quantitative phase analysis device according to one embodiment of the present invention is a quantitative phase analysis device for analyzing non-crystalline phases, which is configured to perform quantitative phase analysis of a non-crystalline phase contained in a sample based on a powder diffraction pattern of the sample, quantitative phase analysis device comprising at least one microprocessor configured to: acquire the powder diffraction pattern of the sample; acquire information on one non-crystalline phase and one or more crystalline phases contained in the sample; acquire a fitting function for each of the one or more crystalline phases; execute whole-powder pattern fitting for the powder diffraction pattern of the sample by using the fitting function for each of the one non-crystalline phase and the one or more crystalline phases, to thereby acquire a fitting result; and calculate a weight ratio of the one non-crystalline phase and the one or more crystalline phases based on the fitting result, wherein the fitting function for each of the one or more crystalline phases is one fitting function selected from the group consisting of a first fitting function that uses an integrated intensity obtained by whole-powder pattern decomposition, a second fitting function that uses an integrated intensity obtained by observation or calculation, and a third fitting function that uses a profile intensity obtained by observation or calculation, and wherein the fitting function for the one non-crystalline phase is the third fitting function.

(2) In the quantitative phase analysis device according to the above-mentioned item (1), the microprocessor configured to calculate a weight fraction by using an intensity-composition (IC) formula.

(3) In the quantitative phase analysis device according to the above-mentioned item (1) or (2), the quantitative phase analysis device may be configured to select, for at least one crystalline phase of the one or more crystalline phases, any one of the first fitting function and the second fitting function.

(4) A quantitative phase analysis method for analyzing non-crystalline phases according to one embodiment of the present invention is an quantitative phase analysis method for performing quantitative analysis of a non-crystalline phase contained in a sample based on a powder diffraction pattern of the sample, the quantitative phase analysis method comprising steps of: acquiring the powder diffraction pattern of the sample; acquiring information on one non-crystalline phase and one or more crystalline phases contained in the sample; acquiring a fitting function for each of the one or more crystalline phases; executing whole-powder pattern fitting for the powder diffraction pattern of the sample by using the fitting function for each of the one non-crystalline phase and the one or more crystalline phases, to thereby acquire a fitting result; and calculating a weight ratio of the one non-crystalline phase and the one or more crystalline phases based on the fitting result, wherein the fitting function for each of the one or more crystalline phases is one fitting function selected from the group consisting of a first fitting function that uses an integrated intensity obtained by whole-powder pattern decomposition, a second fitting function that uses an integrated intensity obtained by observation or calculation, and a third fitting function that uses a profile intensity obtained by observation or calculation, and wherein the fitting function for the one non-crystalline phase is the third fitting function.

(5) A non-transitory computer-readable storage medium storing a quantitative phase analysis program for analyzing non-crystalline phases is a non-transitory computer-readable storage medium storing a quantitative phase analysis program for performing quantitative phase analysis of a non-crystalline phase contained in a sample based on a powder diffraction pattern of the sample, the quantitative phase analysis program causing a computer to execute processing comprising: acquiring the powder diffraction pattern of the sample; acquiring information on one non-crystalline phase and one or more crystalline phases contained in the sample; acquiring a fitting function for each of the one or more crystalline phases; executing whole-powder pattern fitting for the powder diffraction pattern of the sample by using the fitting function for each of the one non-crystalline phase and the one or more crystalline phases, to thereby acquire a fitting result; and calculating a weight ratio of the one non-crystalline phase and the one or more crystalline phases based on the fitting result, wherein the fitting function for each of the one or more crystalline phases is one fitting function selected from the group consisting of a first fitting function that uses an integrated intensity obtained by whole-powder pattern decomposition, a second fitting function that uses an integrated intensity obtained by observation or calculation, and a third fitting function that uses a profile intensity obtained by observation or calculation, and wherein the fitting function for the one non-crystalline phase is the third fitting function.

According to the present invention, there are provided the quantitative phase analysis device for analyzing non-crystalline phases, the quantitative phase analysis method for analyzing non-crystalline phases, and the non-transitory computer-readable storage medium storing a quantitative phase analysis program, which enable the quantitative analysis of the sample containing the one non-crystalline phase and the one or more crystalline phases to be performed in a simpler manner.

BRIEF DESCRIPTION OF DRAWINGS

FIG. 3 is a table for showing samples to be used for an example of the non-crystalline phase quantitative phase analysis method according to the first embodiment of the present invention.

FIG. 9 is a table for showing samples to be used for an example of a non-crystalline phase quantitative phase analysis method according to a second embodiment of the present invention.

FIG. 11A is a table for showing results of quantitative phase analysis obtained in the example of the non-crystalline phase quantitative phase analysis method according to the second embodiment of the present invention.

FIG. 11B is a table for showing results of quantitative phase analysis obtained in the example of the non-crystalline phase quantitative phase analysis method according to the second embodiment of the present invention.

DETAILED DESCRIPTION OF THE INVENTION

Figure 1:
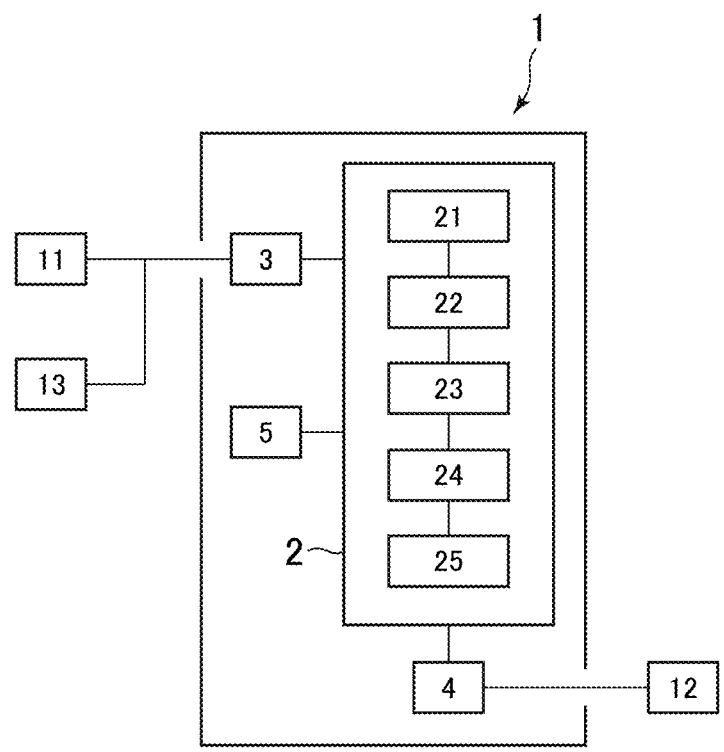
FIG. 1 is a block diagram for illustrating a configuration of a quantitative phase analysis device for analyzing non-crystalline phases according to a first embodiment of the present invention.

Now, embodiments of the present invention will be described with reference to the drawings. For clearer illustration, some sizes, shapes, and the like are schematically illustrated in the drawings in comparison to actual ones. However, the sizes, the shapes, and the like are merely examples, and do not limit understanding of the present invention. Further, like elements that are similar to those described relating to drawings already referred to are denoted by like reference symbols herein and in each of the drawings, and a detailed description thereof is sometimes omitted as appropriate.

First Embodiment

FIG. 1 is a block diagram for illustrating a configuration of a quantitative phase analysis device 1 according to a first embodiment of the present invention. A non-crystalline phase quantitative phase analysis method according to this embodiment is performed by the quantitative phase analysis device 1 according to this embodiment. That is, the quantitative phase analysis device 1 according to this embodiment is a device capable of simply performing quantitative phase analysis of a sample through use of the non-crystalline phase quantitative phase analysis method according to this embodiment.

The quantitative phase analysis device 1 according to this embodiment includes an analysis unit 2, an information input unit 3, an information output unit 4, and a storage unit 5. The quantitative phase analysis device 1 is achieved by a computer used in general, and further includes a read only memory (ROM) (not shown) and a random access memory (RAM) (not shown). The ROM and the RAM form internal memories of the computer. The storage unit 5 is a recording medium, and may be formed of a semiconductor memory, a hard disk drive, or any other suitable recording medium. In this case, the storage unit 5 is installed inside the computer, but may be installed outside the computer. The storage unit 5 may be a single recording medium, or may be formed of a plurality of recording mediums. The quantitative phase analysis device 1 is connected to an X-ray diffractometer 11 and an input device 13. The X-ray diffractometer 11 is configured to subject a sample having a powder form to X-ray diffraction measurement to measure X-ray diffraction data on the sample and output the measured X-ray diffraction data to the information input unit 3 of the quantitative phase analysis device 1. The input device 13 is achieved by a keyboard, a mouse, a touch panel, or the like. The information input unit 3 is an interface or the like to be connected to the X-ray diffractometer 11 and the input device 13. The analysis unit 2 is configured to acquire the X-ray diffraction data from the information input unit 3 and subject the X-ray diffraction data to preprocessing to generate a powder diffraction pattern of the sample. In this case, the "preprocessing" refers to processing such as smoothing of data and removal of a Kα2 component. The powder diffraction pattern generated by the analysis unit 2 is input and stored in the storage unit 5. The X-ray diffractometer 11 may include an analysis unit (data processing unit), and the analysis unit of the X-ray diffractometer 11 may subject X-ray diffraction data to be measured to preprocessing to generate a powder diffraction pattern of the sample and output the powder diffraction pattern of the sample to the information input unit 3 of the quantitative phase analysis device 1. The analysis unit 2 is configured to acquire the powder diffraction pattern of the sample from the storage unit 5 (or the information input unit 3) and perform quantitative phase analysis of crystalline phases contained in the sample based on the powder diffraction pattern to output a weight ratio of the crystalline phases subjected to quantitative phase analysis to the information output unit 4 as an analysis result. The information output unit 4 is an interface or the like to be connected to a display device 12, and is configured to output the weight ratio of the crystalline phases to the display device 12. The display device 12 is configured to display the analysis result of the phase.

Figure 2:
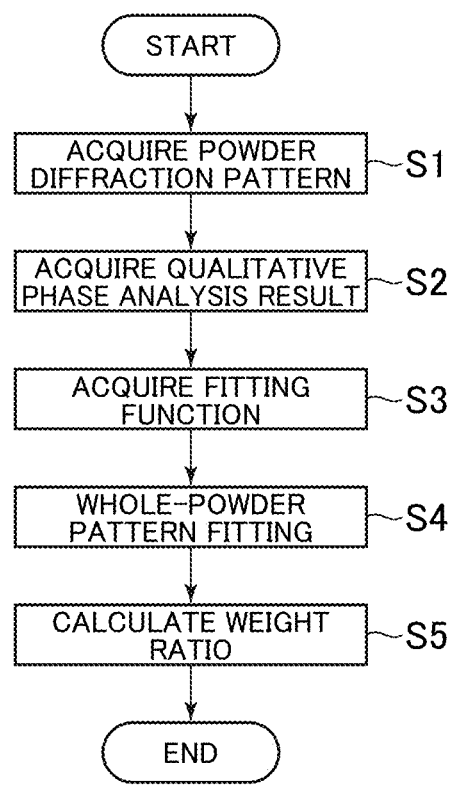
FIG. 2 is a flow chart for illustrating a non-crystalline phase quantitative phase analysis method according to the first embodiment of the present invention.

FIG. 2 is a flowchart for illustrating the non-crystalline phase quantitative phase analysis method according to this embodiment. The analysis unit 2 of the quantitative phase analysis device 1 includes a powder diffraction pattern acquisition unit 21, a qualitative phase analysis result acquisition unit 22, a fitting function acquisition unit 23, a whole powder-pattern fitting unit 24, and a weight ratio calculation unit 25, and those units are means for executing respective steps of the non-crystalline phase quantitative phase analysis method described below. Further, a non-crystalline phase quantitative phase analysis program according to this embodiment is a program for causing the computer to function as the respective means.

Step S1: Powder Diffraction Pattern Acquisition Step

A powder diffraction pattern of a sample is acquired (Step S1: powder diffraction pattern acquisition step). The powder diffraction pattern of the sample is stored in the storage unit 5. Alternatively, as described above, the X-ray diffractometer 11 may include an analysis unit (data processing unit) and subject X-ray diffraction data on a sample to be measured to preprocessing to generate a powder diffraction pattern of the sample. Then, the X-ray diffractometer 11 may output the powder diffraction pattern of the sample to the information input unit 3 of the quantitative phase analysis device 1. The analysis unit 2 of the quantitative phase analysis device 1 acquires the powder diffraction pattern of the sample from the storage unit 5 (or the information input unit 3). In the powder diffraction pattern, the horizontal axis represents a diffraction angle 2θ indicating a peak position, and the vertical axis represents a spectrum indicating an intensity of a diffraction X-ray. In this case, the diffraction angle 2θ is an angle formed by an incident X-ray direction and a diffraction X-ray direction. The X-ray diffraction data on the sample measured by the X-ray diffractometer 11 may be input to the information input unit 3 or stored in the storage unit 5. In this case, the analysis unit 2 acquires the X-ray diffraction data on the sample from the information input unit 3 or the storage unit 5 and subjects the X-ray diffraction data on the sample to preprocessing to generate the powder diffraction pattern of the sample.

Step S2: Qualitative Phase Analysis Result Acquisition Step

Information on one non-crystalline phase and one or more crystalline phases contained in the sample is acquired (Step S2: qualitative phase analysis result acquisition step). The analysis unit 2 identifies crystalline phases based on the position and the intensity of a diffraction line (peak) of the powder diffraction pattern of the sample acquired in Step S1. That is, the analysis unit 2 acquires information on the one or more crystalline phases contained in the sample by qualitative phase analysis. In this case, the information on the crystalline phases contains chemical compositions thereof, information on polymorphism when the crystalline phases have polymorphism having different crystal structures, and a plurality of peak positions of powder diffraction patterns of the crystalline phases. The information may further contain intensities at the plurality of peak positions of the powder diffraction patterns of the crystalline phases.

Based on the peak position and the peak intensity of the powder diffraction pattern of the sample acquired in Step S1, the analysis unit 2 acquires information on the plurality of crystalline phases contained in the sample by subjecting the sample to qualitative phase analysis. However, the present invention is not limited thereto, and the information input unit 3 may acquire the information on the plurality of crystalline phases contained in the sample, which is a result of the qualitative phase analysis of the sample, from the input device 13. Further, information on the one non-crystalline phase is acquired by subjecting the sample to other known qualitative phase analysis. The information on the one non-crystalline phase contains a chemical composition thereof.

Step S3: Fitting Function Acquisition Step

A fitting function for each of the one or more crystalline phases contained in the sample is acquired (Step S3: fitting function acquisition step). A user determines to execute fitting by using one fitting function, which is selected from the group consisting of first to third fitting functions, for the powder diffraction pattern of each of the one or more crystalline phases based on information on the powder diffraction pattern of the sample acquired in Step S1 and information on the one or more crystalline phases acquired in Step S2. The user uses the input device 13 to input a fitting function to be used for each of the plurality of crystalline phases. The analysis unit 2 acquires a fitting function for each of the plurality of crystalline phases, which is input to the input device 13 by the information input unit 3. The third fitting function is used for the powder diffraction pattern (amorphous halo) of the one non-crystalline phase.

Now, description will be given of the first to third fitting functions. When the fitting function $y(2\theta)$ representing the powder diffraction pattern of the entire sample can be regarded as superimposition of a background intensity $y(2\theta)_{back}$ and $y(2\theta)_k$ representing the powder diffraction pattern of each of the K crystalline phases (K is an integer of 2 or more) (k-th crystalline phase; k is an integer of 1 or more and K or less), the fitting function $y(2\theta)$ representing the powder diffraction pattern of the entire sample is represented by the following Expression 10.

$$y(2\theta)=y(2\theta)_{back}+\Sigma_{k=1}^{K}y(2\theta)_k \quad (10)$$

In this embodiment, the sample contains one non-crystalline phase and K−1 crystalline phases. For example, through use of the fitting function $y(2\theta)_k$ representing the powder diffraction pattern of the k-th (k is an integer satisfying 1≤k≤K−1) crystalline phase and through setting of the fitting function representing the powder diffraction pattern (non-crystalline halo) of the one non-crystalline phase as the fitting function $y(2\theta)_K$ representing the powder diffraction pattern of the K-th crystalline phase, even in this embodiment, the fitting function $y(2\theta)$ representing the powder diffraction pattern of the entire sample can be represented by Expression 10.

The fitting function $y(2\theta)_k$ representing the powder diffraction pattern of each crystalline phase can be represented by various forms, and serves as the fitting function. An integrated intensity acquired through whole-powder pattern decomposition based on a Pawley method is used as the first fitting function, and is represented by the following Expression 11.

$$y(2\theta)_k=\Sigma_j I_{jk} P(2\theta)_{jk} \quad (11)$$

In this expression, "$P(2\theta)_{jk}$" represents a normalized profile function describing the profile shape. A function defined on an interval [−∞, +∞], for example, a pseudo-Voigt function, is used as $P(2\theta)$. However, in actuality, the function may be considered to have a value only around the peak position of each diffraction line.

An integrated intensity obtained through observation or calculation, which is input from the outside, is used as the second fitting function, and is represented by the following Expression 12.

$$y(2\theta)_k=\Sigma_j Sc_k I'_{jk} P(2\theta)_{jk} \quad (12)$$

In this expression, "$Sc_k$" represents a scale factor, and is defined by $I_{jk}=Sc_k I'_{jk}$. $\{I'_{jk}\}$, which is a set of integral intensities, may be a set of integral intensities separately measured (or calculated) for a single-phase sample of the k-th crystalline phase, or may be a function of the crystal structure parameter. In fitting, the set $\{I'_{jk}\}$ of integral intensities is fixed, and the scale factor $Sc_k$ is set to be more precise instead.

A profile intensity obtained through observation or calculation, which is input from the outside, is used as the third fitting function, and is represented by the following Expression 13.

$$y(2\theta)_k=Sc_k y(2\theta)'_k \quad (13)$$

In this expression, "$Sc_k$" represents a scale factor similarly to the second fitting function. $y(2\theta)'_k$ may represent a profile intensity representing the k-th powder diffraction pattern, which is separately measured (or calculated) for a single-phase sample of the k-th crystalline phase, and may be calculated at the time of fitting based on the crystal structure parameter. In fitting, the profile intensity $y(2\theta)'_k$ representing the k-th powder diffraction pattern is fixed, and the scale factor $Sc_k$ is set to be more precise instead.

The user determines which one of the first to third fitting functions is to be used to perform fitting for the powder diffraction pattern of each of the one or more crystalline phases based on the information on the powder diffraction pattern of the sample and the information on the one or more crystalline phases. The first fitting function is desired to be selected when the crystalline phase has a high crystallinity and the symmetry of the crystal is relatively high. In contrast, the second or third fitting function is desired to be used for a crystalline phase having a low symmetry and exhibiting a complex diffraction pattern including a large number of peaks. In particular, when the crystallinity is low and the peak profile has collapsed, the third fitting function may be used. As described above, the third fitting function is used as the fitting function for the one non-crystalline phase.

Step S4: Whole-Powder Pattern Fitting Step

The fitting function for each of the one non-crystalline phase and the one or more crystalline phases acquired in Step S3 is used to execute whole-powder pattern fitting for the powder diffraction pattern of the sample to acquire a fitting result (Step S4: whole-powder pattern fitting step). In this case, the fitting function to be used for whole-powder pattern fitting is Expression 10, and the fitting function $y(2\theta)_k$ representing the powder diffraction pattern of the k-th crystalline phase (k is an integer satisfying 1≤k≤K−1) described in Expression 10 is any one of the first to third fitting functions. Further, the fitting function $y(2\theta)_k$ representing the powder diffraction pattern of the K-th (k=K) crystalline phase (K-th crystalline phase corresponds to one non-crystalline phase) is the third fitting function.

When the first fitting function is used, the parameter of a model required for calculating the shape of the profile is: (a) a parameter for determining a full width half maximum (FWHM), (b) a parameter for determining the shape of the profile, and (c) a lattice constant of the k-th crystalline phase. When the first fitting function is used, the initial value of the integrated intensity $I_{jk}$ is not required.

When the second fitting function is used, the parameter of a model required for calculating the shape of the profile includes the above-mentioned parameters (a) to (c) similarly to the case of using the first fitting function, and further includes the scale factor and the parameter of the integrated intensity determined in advance. As described above, the parameter of the integrated intensity is fixed in fitting.

When the third fitting function is used, the parameter of a model required for calculating the shape of the profile includes the scale factor and data on the measured or calculated profile intensity $y(2\theta)'$ representing the powder diffraction pattern of the k-th crystalline phase from which the background intensity is removed. As described above, the profile intensity $y(2\theta)'$ representing the powder diffraction pattern of the k-th crystalline phase is fixed in fitting.

Even when any one of the first to third fitting functions is used, the parameter of the background intensity $y(2\theta)_{back}$ is required as described in Expression 10. Those parameters are optimized by fitting to acquire results thereof.

Step S5: Weight Ratio Calculation Step

The weight ratio of the plurality of phases is calculated based on the fitting result acquired in Step S4 (weight ratio calculation step).

When the first fitting function is used, Expression 7 is used to calculate the parameter $S_k$ of the k-th crystalline phase based on the integrated intensity $I_{jk}$.

When the second fitting function is used, the following Expression 14 is used to calculate the parameter $S_k$ of the k-th crystalline phase based on the scale factor $Sc_k$ and the integrated intensity $I'_{jk}$.

$$S_k = Sc_k \sum_{j=1}^{Nk} I'_{jk} G_{jk} \quad (14)$$

When the third fitting function is used, the following Expression 15 is used to calculate the parameter $S_k$ of the k-th crystalline phase.

$$S_k = Y_k = Sc_k \int_{2\theta_L}^{2\theta_H} y(2\theta)'_k G(2\theta) d(2\theta) \quad (15)$$

Now, description is given of derivation of Expression 15. $G_{jk}$, which is defined in Expression 2, can be regarded as a continuous function $G(2\theta)$ with respect to the diffraction angle $2\theta$. When $G(2\theta)$ is multiplied by both sides of Expression 11 and integrated over the finite $2\theta$ range of $[2\theta_L, 2\theta_H]$, the following Expression 16 is obtained. The integrated value obtained through this integration is represented by "$Y_k$". It suffices that the $2\theta$ range contains a sufficient number of diffraction lines required for performing quantitative phase analysis as described above.

$$Y_k = \int_{2\theta_L}^{2\theta_H} y(2\theta)_k G(2\theta) d(2\theta) = \sum_{j=1}^{Nk} I_{jk} \int_{2\theta_L}^{2\theta_H} P(2\theta)_{jk} G(2\theta) d(2\theta) \quad (16)$$

As described above, the profile function $P(2\theta)_{jk}$ may be considered to have a value only around the peak position of each diffraction line, and $G(2\theta)$ to be multiplied by the profile function $P(2\theta)_{jk}$ may be considered to have a constant value within that range without producing a significant difference. Further, the profile function $P(2\theta)_{jk}$ is normalized so as to satisfy $\int P(2\theta)_{jk} d(2\theta) = 1$. Thus, $Y_k$ may be considered to be equal to the parameter $S_k$ given in Expression 7. Thus, Expression 15 is derived based on Expression 13 and Expression 16. The third fitting function is used as the fitting function for the non-crystalline phase, but in this case, it can be considered that Expression 15 can be applied as it is to the profile intensity of the non-crystalline phase.

As described above, the substance parameter $a_k$ is calculated when the chemical composition of the crystalline phase or the non-crystalline phase is determined by qualitative phase analysis. Further, even when the sample contains an uncertain crystalline phase (uncertain crystalline phase) whose chemical composition is uncertain, the substance parameter $a_k$ of such a substance may be estimated. Further, even when the sample contains the non-crystalline phase, the non-crystalline phase also has the substance parameter $a_k$. Thus, the weight factor $W_k$ of the k-th crystalline phase is calculated by using the substance parameter $a_k$ and the parameter $S_k$ acquired from the fitting result acquired in Step S4.

Thus, it is possible to calculate the weight ratio of the plurality of crystalline phases contained in the sample by using the weight factor $W_k$. Further, it is possible to calculate the weight fraction $w_k$ of the k-th crystalline phase by using Expression 8 or the IC formula (Expression 9).

The non-crystalline phase quantitative phase analysis method according to this embodiment does not include a step of adding a standard reference material, which is required in the related art, and thus highly reliable quantitative phase analysis can be performed with a simple method. Further, in the related art, through addition of a standard reference material to a sample, the state of the sample is changed from an original state (mixed state in which the standard reference material is added), but in this embodiment, it is not required to change the state of the sample.

Now, description will be given of an example of performing quantitative phase analysis for a mixture sample containing one non-crystalline phase (non-crystalline component) by using the non-crystalline phase quantitative phase analysis method according to this embodiment.

FIG. 3 is a table for showing samples to be used for the non-crystalline phase quantitative phase analysis method according to this embodiment. As shown in FIG. 3, the sample is formed of one non-crystalline phase and one crystalline phase, and there is a plurality of types (16 types) of samples, but all of those samples are two-component samples. Each of the samples is a combination of a crystal component of one of $SiO_2$ and $GeO_2$ and an amorphous component of one of $SiO_2$ and $GeO_2$ (2×2, namely, four sets: set 1 to set 4). Further, as a mixture ratio of the crystal component and the amorphous component, there are four mixture ratios of (a) 20:80, (b) 40:60, (c) 60:40, and (d) 80:20. That is, there are "four sets×four composition ratios", namely, 16 types of samples in total. $SiO_2$ has a substance parameter $a_k$ of 0.18545, and $GeO_2$ has a substance parameter $a_k$ of 0.09079. Irrespective of whether the substance is the crystalline phase or the non-crystalline phase, the same substance (e.g., $SiO_2$) has the same substance parameter $a_k$. Through use of four sets, a set in which two components thereof have the same substance parameter $a_k$ and a set in which two components thereof have substance parameters $a_k$ that are significantly different from each other are handled at the same time.

Figure 4A:
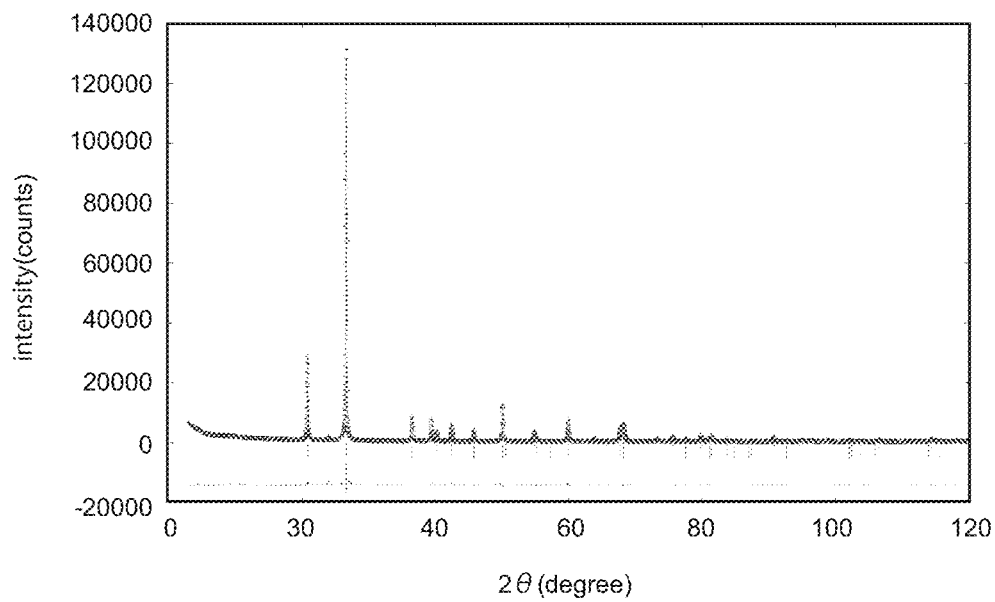
FIG. 4A is a graph for showing a fitting result obtained in Step S4 in this embodiment for a single-component crystalline phase $SiO_2$.
Figure 4B:
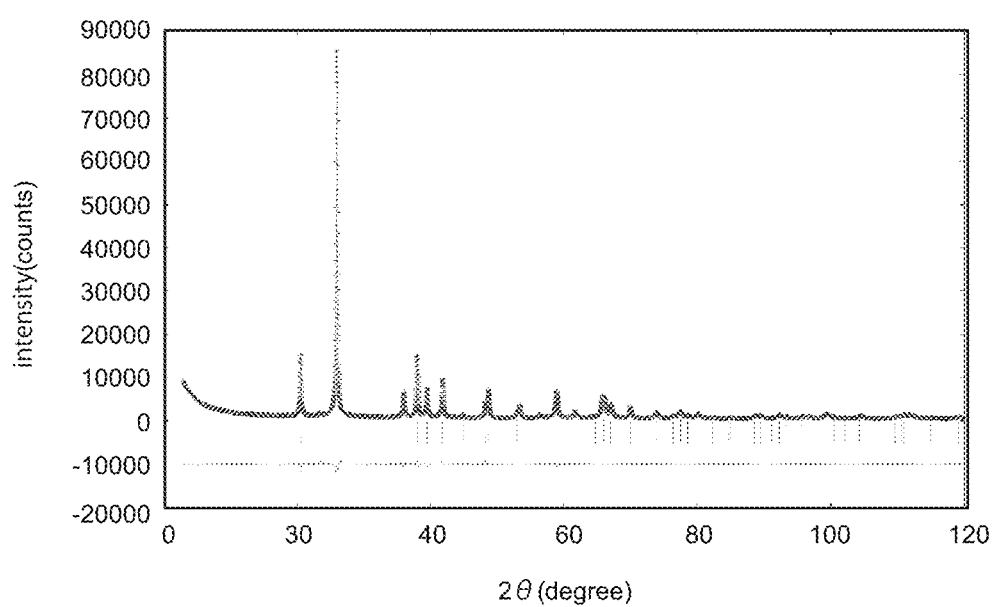
FIG. 4B is a graph for showing a fitting result obtained in Step S4 in this embodiment for a single-component crystalline phase $GeO_2$.

FIG. 4A is a graph for showing a fitting result obtained in Step S4 in this embodiment for the single-component crystalline phase $SiO_2$. FIG. 4B is a graph for showing a fitting result obtained in Step S4 in this embodiment for the single-component crystalline phase $GeO_2$. The first fitting function is selected as the fitting function for each of the crystalline phase SiO$_2$ and the crystalline phase GeO$_2$. A diffraction pattern shown in an upper part of each of FIG. 4A and FIG. 4B is a calculated powder diffraction pattern obtained by fitting, and respective peak positions are indicated by vertical lines. A pattern shown in a lower part of each of FIG. 4A and FIG. 4B is a residual plot obtained by subtracting the calculated powder diffraction pattern from the observed powder diffraction pattern. Peaks observed in the residual plot are very minute, and pattern fitting is performed with high precision.

Figure 5:
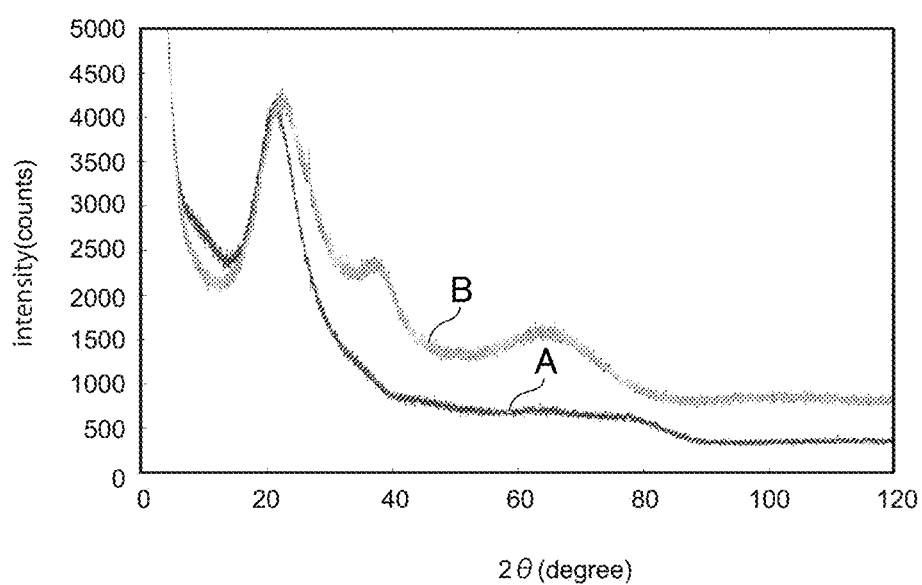
FIG. 5 is a graph for showing observed powder diffraction patterns of the single-component non-crystalline phases to be measured.

FIG. 5 is a graph for showing observed powder diffraction patterns of the single-component non-crystalline phase to be measured. In FIG. 5, an observed powder diffraction pattern (amorphous halo) of the single-component non-crystalline phase SiO$_2$ is shown as a curve A, and an observed powder diffraction pattern (amorphous halo) of the single-component non-crystalline phase GeO$_2$ is shown as a curve B. When the observed powder diffraction patterns shown in FIG. 5 are compared with those of FIG. 4A and FIG. 4B, it is understood that the powder diffraction pattern of the non-crystalline phase is also specifically different in shape from the powder diffraction pattern of the crystalline phase.

Figure 6:
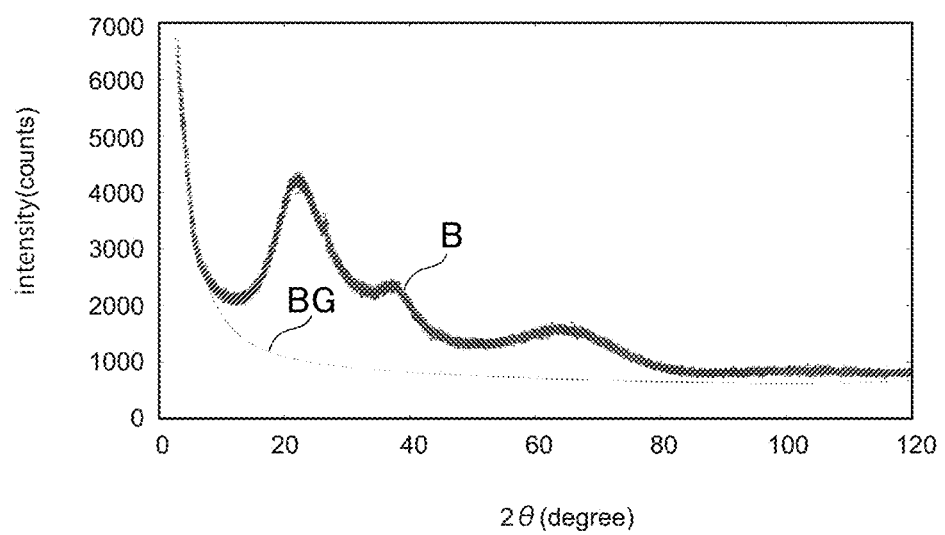
FIG. 6 is a graph for showing the observed powder diffraction pattern of the single-component non-crystalline phase $GeO_2$ to be measured and a background intensity of the crystalline phase $GeO_2$.

FIG. 6 is a graph for showing the observed powder diffraction pattern of the single-component non-crystalline phase GeO$_2$ to be measured and the background intensity $y(2\theta)_{back}$ of the crystalline phase GeO$_2$. A curve B shown in FIG. 6 corresponds to the curve B shown in FIG. 5, and is the observed powder diffraction pattern of the single-component non-crystalline phase GeO$_2$. A curve BG shown in FIG. 6 is a calculated background intensity $y(2\theta)_{back}$, which is obtained by whole-powder pattern fitting for the single-component crystalline phase GeO$_2$.

Figure 7:
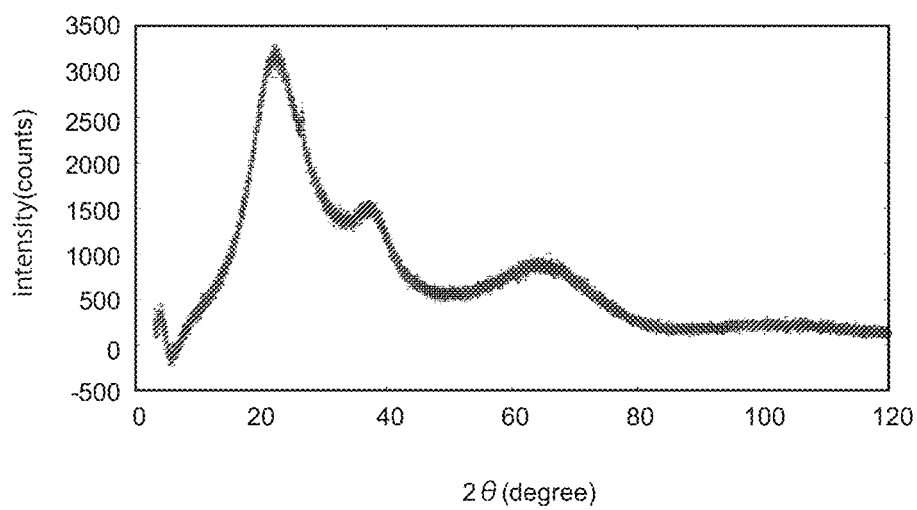
FIG. 7 is a graph for showing an observed powder diffraction pattern of the single-component non-crystalline phase $GeO_2$ obtained after being processed.

FIG. 7 is a graph for showing an observed powder diffraction pattern of the single-component non-crystalline phase GeO$_2$ obtained after being processed. The curve shown in FIG. 7 is obtained by subtracting the curve BG shown in FIG. 6 from the curve B shown in FIG. 6. That is, the processing as used in this case refers to background (BG) processing. Similar processing is performed for the non-crystalline phase SiO$_2$. It is assumed here that "the background intensities of the crystalline phase (crystalline substance) and the non-crystalline phase (non-crystalline substance) having the same composition measured under the same experiment condition are the same."

In the non-crystalline phase quantitative phase analysis method according to this embodiment, a two-component sample is used. When the sample is formed of one non-crystalline phase and one crystalline phase, through execution of whole-powder pattern fitting for the observed powder diffraction pattern to simultaneously optimize a background parameter in the background intensity $y(2\theta)_{back}$, an integrated intensity parameter or a scale factor in the calculated powder diffraction pattern of the one crystalline phase, and the scale factor of the powder diffraction pattern (amorphous halo) of the one non-crystalline phase, an intensity contribution $S_k$ of the one crystalline phase and an intensity contribution $S_k$ of the one non-crystalline phase (one non-crystalline phase corresponds to k=K=2) can be obtained. In this embodiment, mixture samples having four composition ratios are prepared for each of the four sets, and the quantitative phase analysis is executed for each of the samples as described above.

Figure 8:
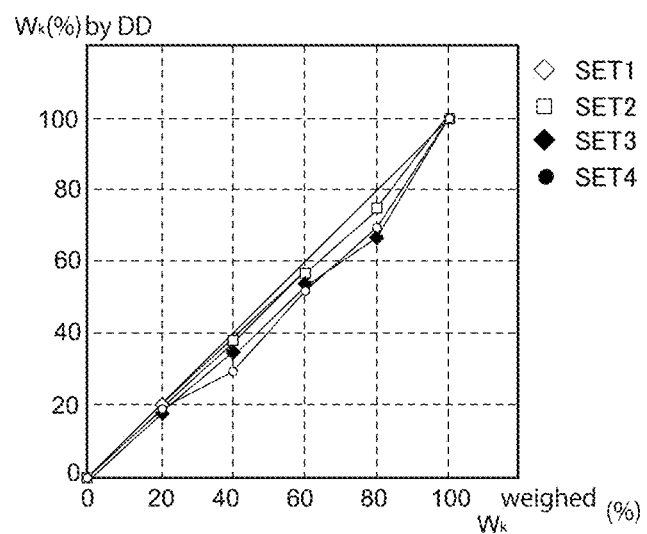
FIG. 8 is a graph for showing results of quantitative analysis obtained in the example of the non-crystalline phase quantitative phase analysis method according to the first embodiment of the present invention.

FIG. 8 is a graph for showing results of the quantitative phase analysis in Example 1 of this embodiment. FIG. 8 shows results of the quantitative phase analysis for a total of 16 types of samples obtained by setting four composition ratios for each of the four sets. The horizontal axis of FIG. 8 represents the weight fraction $w_k$ of the crystal component weighed when the sample is prepared, and the vertical axis of FIG. 8 represents the weight fraction $w_k$ of the crystal component obtained by the quantitative phase analysis of the crystal component. For reference, a weight fraction $w_k$ (=0) of a pure non-crystalline phase and a weight fraction $w_k$ (=100%) of a pure crystalline phase are shown together. As shown in FIG. 8, although some of the sets have a small error, even for the mixture samples having the substance parameters $a_k$ that are significantly different from each other, analysis results are obtained along a substantially ideal proportional curve (y=x) as in the mixture samples having the same value of substance parameter $a_k$.

Second Embodiment

FIG. 9 is a table for showing samples to be used for an non-crystalline phase quantitative phase analysis method according to a second embodiment of the present invention. Each of the samples to be used in this embodiment is formed of one non-crystalline phase and a plurality of crystalline phases, and quantitative phase analysis is executed for both of a sample formed of one non-crystalline phase and two crystalline phases (three-component sample) and a sample formed of one non-crystalline phase and three crystalline phases (four-component sample). Specifically, as shown in FIG. 9, the three-component sample is formed of a crystalline phase GeO$_2$, a crystalline phase ZnO, and a non-crystalline phase SiO$_2$, and the four-component sample is formed of the crystalline phase GeO$_2$, the crystalline phase ZnO, a crystalline phase α-Al$_2$O$_3$, and the non-crystalline phase SiO$_2$.

The samples to be used for the quantitative phase analysis are designed to be created such that the weight fractions $w_k$ of respective components are the same. The weight fractions $w_k$ of respective components of the three-component sample actually prepared were $w_1$=33.479%, $w_2$=33.416%, and $w_3$=33.105% for the crystalline phase GeO$_2$, the crystalline phase ZnO, and the non-crystalline phase SiO$_2$, respectively. The weight fractions $w_k$ of respective components of the four-component sample actually prepared were $w_1$=25.076%, $w_2$=24.925%, $w_3$=25.121%, and $w_4$=24.878% for the crystalline phase GeO$_2$, the crystalline phase ZnO, the crystalline phase α-Al$_2$O$_3$, and the non-crystalline phase SiO$_2$, respectively. The main measurement conditions are as follows: an X-ray diffractometer in which power of an X-ray source is 9 kW, a sample is a powder sample, a voltage and a current of a detector to be used in measurement are 45 kV and 200 mA, respectively, a depth of a sample holder is 0.5 mm, and a scattered radiation protector (height: 2 mm) is used to prevent scattered radiation. In this embodiment, in Step S4, the background intensity $y(2\theta)_{back}$ is optimized (set to be more precise) as well.

In the following, Step S3 and Step S4 in this embodiment will be described. In Step 3 in Example 2, the first fitting function is determined to be used for each of the two crystalline phases of the three-component sample and the three crystalline phases of the four-component sample, but it is to be understood that the present invention is not limited thereto.

In Step S4, each parameter is set to be more precise by fitting, but it is desired that each parameter be set to be more precise in a stepwise manner. Firstly, in the first cycle, the parameter ($I_{jk}$) of the integrated intensity of the crystalline phase, the scale factor ($S_{ck}$) of the non-crystalline phase, and the parameter of the background intensity are set to be more precise. Secondly, in the subsequent cycle, in addition to the above-mentioned parameters, other parameters (e.g., a lattice constant of each crystalline phase, zero-point adjustment, 2θ adjustment of an amorphous scattering curve, and UVW parameters of each crystalline phase) are simultaneously set to be more precise.

Figure 10A:
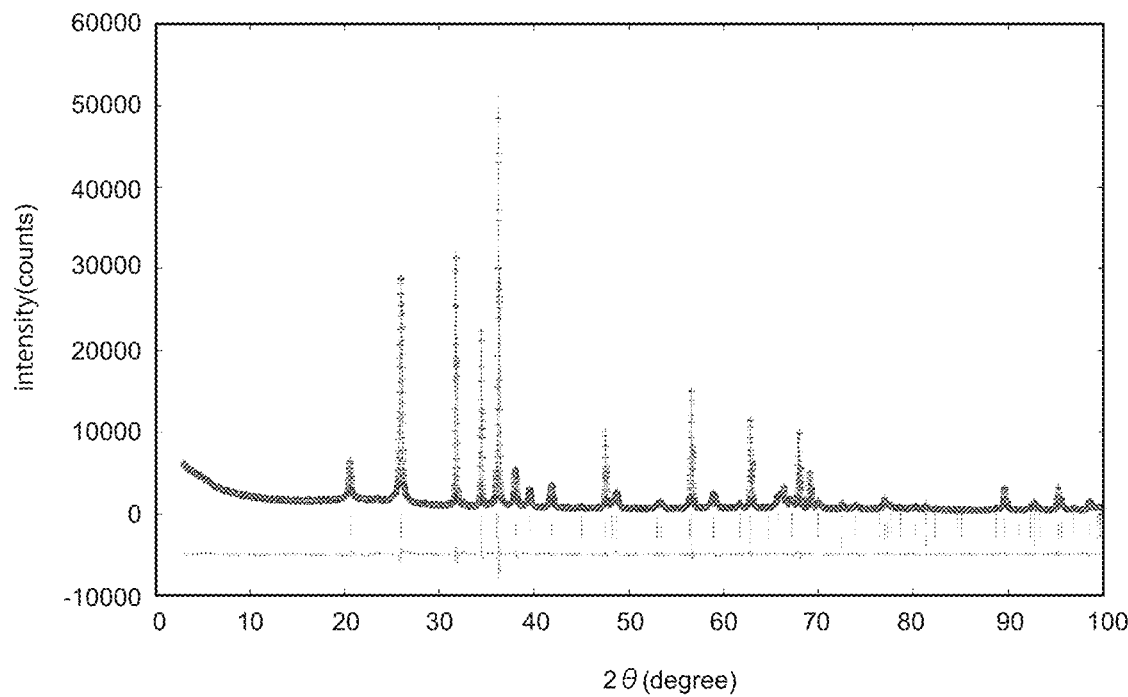
FIG. 10A is a graph for showing a fitting result obtained in Step S4 in this embodiment for two crystalline phases among components of a three-component sample.
Figure 10B:
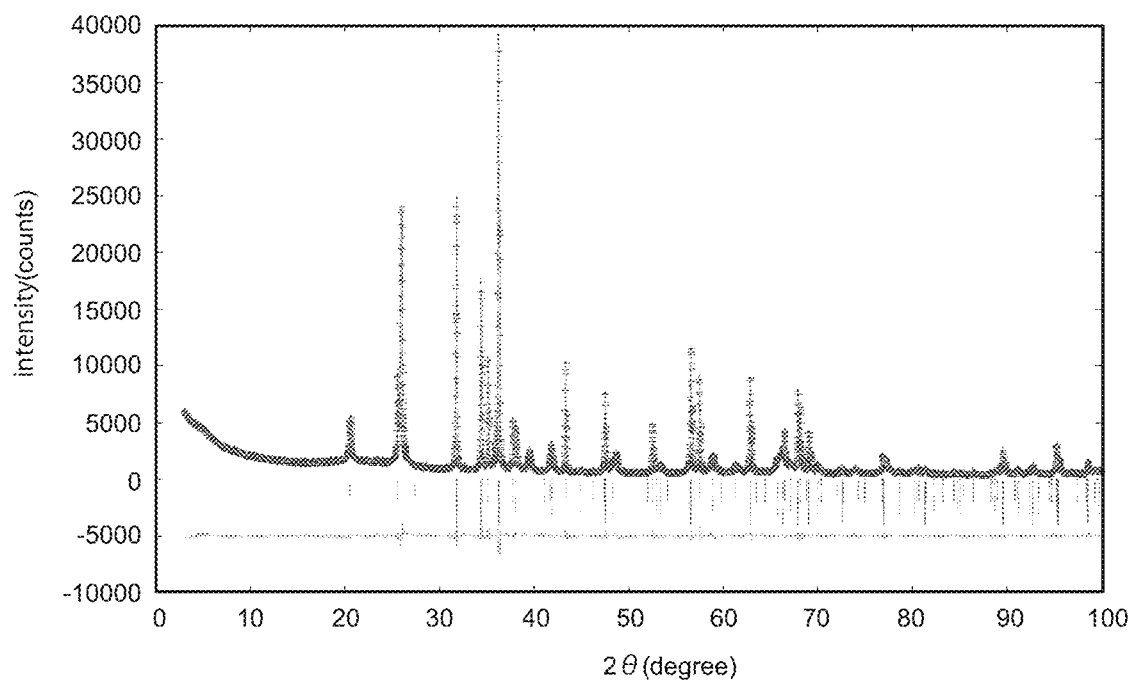
FIG. 10B is a graph for showing a fitting result obtained in Step S4 in this embodiment for three crystalline phases among components of a four-component sample.

FIG. 10A is a graph for showing a fitting result obtained in Step S4 in this embodiment for the two crystalline phases among components of the three-component sample. FIG. 10B is a graph for showing a fitting result obtained in Step S4 in this embodiment for the three crystalline phases among components of the four-component sample. FIG. 11A and FIG. 11B are tables for showing results of quantitative phase analysis obtained by the quantitative phase analysis in Example 2 of this embodiment. FIG. 11A shows results of quantitative phase analysis for the three-component sample, and FIG. 11B shows results of quantitative phase analysis for the four-component sample. A diffraction pattern shown in an upper part of each of FIG. 10A and FIG. 10B is a calculated powder diffraction pattern obtained by fitting, and respective peak positions are indicated by vertical lines. A pattern shown in a lower part of each of FIG. 10A and FIG. 10B is a residual plot. As shown in FIG. 10A and FIG. 10B, peaks observed in the residual plot are very minute, and pattern fitting is performed with high precision. As shown in FIG. 11A and FIG. 11B, whole-powder pattern fitting is executed for 2θ analysis ranges of the whole-powder pattern fitting of a range (i) of from 3° to 125° and a range (ii) of from 3° to 100°. Further, for each of the case in which the 2θ analysis range is the range (i) and the case in which the 2θ analysis range is the range (ii), an error of the weight fraction $w_k$ ($w_1$ to $w_3$ or $w_4$), a root mean squared error (RMSE), an R value ($R_{wp}$) in the whole-powder pattern fitting, and chi-square ($\chi^2$) are shown. The parameter of the background intensity is added to parameters that are to be refined in the whole-powder pattern fitting.

Mass analysis results shown in FIG. 11A and FIG. 11B will be considered. For the 2θ analysis range, results with smaller errors are obtained in the range (ii) of from 3° to 100° than in the range (i) of from 3° to 125°. For any of the three-component sample and the four-component sample, highly precise analysis results are obtained, which shows the effectiveness of the quantitative phase analysis (the quantitative phase analysis of the sample containing the amorphous component) according to this embodiment. For any of the three-component sample and the four-component sample, analysis results with smaller errors are obtained by setting the parameter of the background intensity to be precise, which shows the effectiveness of the quantitative phase analysis according to this embodiment.

Also in the first embodiment, the parameter of the background intensity is set to be more precise in Step S4, but the present invention is not limited thereto. When the chemical compositions of one non-crystalline phase and one crystalline phase of the two-component sample are the same, it can be assumed that the background intensity of the one non-crystalline phase is the same as the background intensity of the one crystalline phase. In this case, whole-powder pattern fitting can be executed more simply.

In the above, the quantitative phase analysis device, the quantitative phase analysis method, and the quantitative phase analysis program according to the embodiments of the present invention have been described. The present invention is not limited to the above-mentioned embodiments and can be widely applied. For example, the powder diffraction pattern in the above-mentioned embodiments is obtained by X-ray diffraction measurement. However, the powder diffraction pattern is not limited thereto and may be obtained by another measurement, for example, neutron diffraction measurement. Further, various approximations, such as the determination of diffraction lines included in the powder diffraction pattern and the distribution of intensities of diffraction lines that are superimposed onto each other or close to each other, are considered, as required. In the non-crystalline phase quantitative phase analysis method in the above-mentioned embodiments, the weight ratio of the plurality of crystalline phases is calculated, but another quantitative ratio, for example, a molar ratio, may be calculated based on such a weight ratio.

In the above-mentioned embodiments, the fitting function for each of the one or more crystalline phases is the first fitting function, but the present invention is not limited thereto. The fitting function for the one non-crystalline phase is the third fitting function, and hence when a fitting function other than the third fitting function, that is, the first fitting function or the second fitting function, is selected for at least one crystalline phase of the one or more crystalline phases, a plurality of types of fitting functions are included in the fitting functions at the same time. As a result, a special effect that has not been achieved by the related art can be achieved. Further, when the sample contains a plurality of crystalline phases, two or more fitting functions among the first to third fitting functions may be selected for the plurality of crystalline phases. A plurality of fitting functions is included in the fitting functions at the same time, and as a result, a special effect that has not been achieved by the related art can be achieved.

What is claimed is:

1. A quantitative phase analysis device for analyzing non-crystalline phases, which is configured to perform quantitative phase analysis of a non-crystalline phase contained in a sample based on a powder diffraction pattern of the sample, quantitative phase analysis device comprising at least one microprocessor configured to:
    acquire the powder diffraction pattern of the sample;
    acquire information on one non-crystalline phase and one or more crystalline phases contained in the sample;
    acquire a fitting function for the one non-crystalline phase and for each of the one or more crystalline phases;
    execute whole-powder pattern fitting for the powder diffraction pattern of the sample by using the fitting function for the one non-crystalline phase and for each of the one or more crystalline phases, to thereby acquire a fitting result; and
    calculate a weight ratio of the one non-crystalline phase and the one or more crystalline phases based on the fitting result,
    wherein the fitting function for each of the one or more crystalline phases is independently one fitting function selected from the group consisting of a first fitting function that uses an integrated intensity obtained by whole-powder pattern decomposition, a second fitting function that uses an integrated intensity obtained by observation or calculation, and a third fitting function that uses a profile intensity obtained by observation or calculation, and
    wherein the fitting function for the one non-crystalline phase is the third fitting function.

2. The quantitative phase analysis device according to claim 1, wherein the microprocessor is configured to calculate a weight fraction by using an intensity-composition (IC) formula.

3. The quantitative phase analysis device according to claim 1, wherein the microprocessor is configured to select, for at least one crystalline phase of the one or more crystalline phases, any one of the first fitting function and the second fitting function.

4. A quantitative phase analysis method for analyzing non-crystalline phases for performing quantitative phase analysis of a non-crystalline phase contained in a sample based on a powder diffraction pattern of the sample, the quantitative phase analysis method comprising steps of:

acquiring the powder diffraction pattern of the sample;

acquiring information on one non-crystalline phase and one or more crystalline phases contained in the sample;

acquiring a fitting function for the one non-crystalline phase and for each of the one or more crystalline phases;

executing whole-powder pattern fitting for the powder diffraction pattern of the sample by using the fitting function for the one non-crystalline phase and for each of the one or more crystalline phases, to thereby acquire a fitting result; and calculating a weight ratio of the one non-crystalline phase and the one or more crystalline phases based on the fitting result, wherein the fitting function for each of the one or more crystalline phases is one fitting function selected from the group consisting of a first fitting function that uses an integrated intensity obtained by whole-powder pattern decomposition, a second fitting function that uses an integrated intensity obtained by observation or calculation, and a third fitting function that uses a profile intensity obtained by observation or calculation, and wherein the fitting function for the one non-crystalline phase is the third fitting function.

5. A non-transitory computer-readable storage medium storing a quantitative phase analysis program for analyzing non-crystalline phases for performing quantitative phase analysis of a non-crystalline phase contained in a sample based on a powder diffraction pattern of the sample, the quantitative phase analysis program causing a computer to execute processing comprising:

acquiring the powder diffraction pattern of the sample;

acquiring information on one non-crystalline phase and one or more crystalline phases contained in the sample;

acquiring a fitting function for the one non-crystalline phase and for each of the one or more crystalline phases;

executing whole-powder pattern fitting for the powder diffraction pattern of the sample by using the fitting function for the one non-crystalline phase and for each of the one or more crystalline phases, to thereby acquire a fitting result; and calculating a weight ratio of the one non-crystalline phase and the one or more crystalline phases based on the fitting result, wherein the fitting function for each of the one or more crystalline phases is one fitting function selected from the group consisting of a first fitting function that uses an integrated intensity obtained by whole-powder pattern decomposition, a second fitting function that uses an integrated intensity obtained by observation or calculation, and a third fitting function that uses a profile intensity obtained by observation or calculation, and wherein the fitting function for the one non-crystalline phase is the third fitting function.

* * * * *